(No Model.)
C. D. EDWARDS.
GRAIN SEPARATOR.
No. 375,142. Patented Dec. 20, 1887.
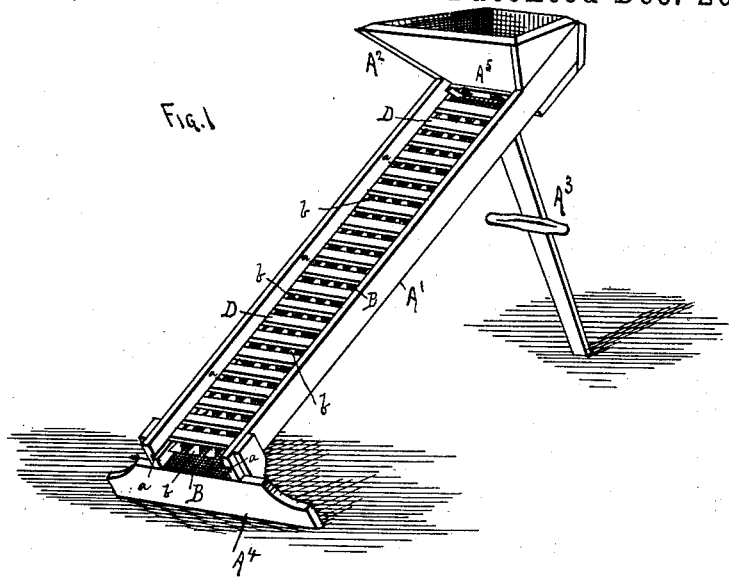
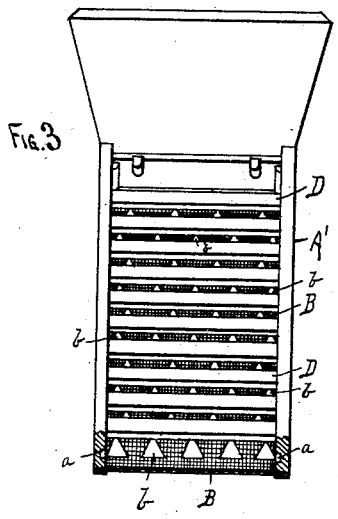
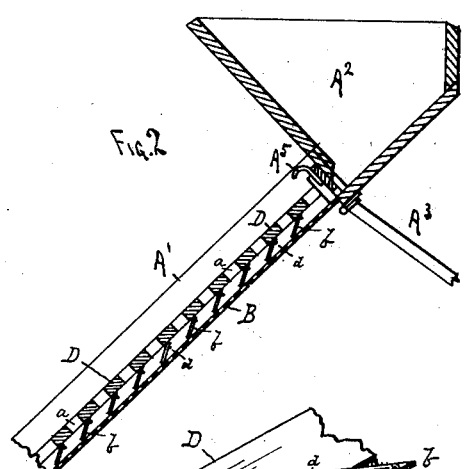
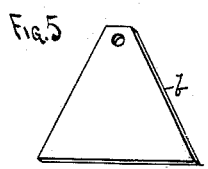
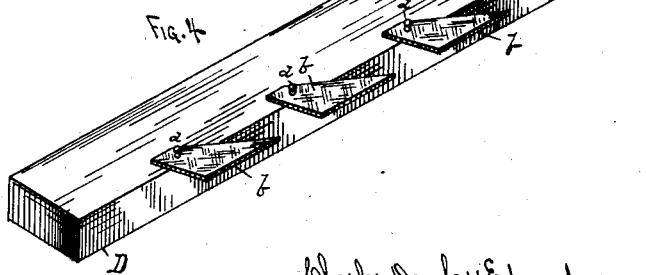
WITNESSES.
C. H. Woodward
Louis Feeser Jr.
Charles Douglass Edwards,
INVENTOR, BY
Louis Feeser Oles,
Atty.

UNITED STATES PATENT OFFICE.

CHARLES DOUGLASS EDWARDS, OF ALBERT LEA, MINNESOTA.

GRAIN-SEPARATOR.

SPECIFICATION forming part of Letters Patent No. 375,142, dated December 20, 1887.

Application filed February 11, 1887. Serial No. 227,301. (No model.)

*To all whom it may concern:*

Be it known that I, CHARLES DOUGLASS EDWARDS, a citizen of the United States, residing at Albert Lea, in the county of Freeborn and State of Minnesota, have invented certain new and useful Improvements in Grain-Separators, of which the following is a specification.

This invention relates to machines for the separation of grain into any grade desired and free of all foul seeds; and it consists in the combination, with an adjustable inclined screen down which the grain is adapted to flow, of a series of floats or check-plates suspended in a forwardly-inclined position from cross-bars above the screen, and with their free ends lying in contact with the screen, to act as yielding retarders or distributers to cause the flowing grain to separate into different grades, according to size, the smaller kernels, with the foul seeds, falling through the meshes of the screen, while only the larger kernels pass over the tail of the screen, as hereinafter shown and described.

In the drawings, Figure 1 is a perspective view of the machine complete. Fig. 2 is an enlarged longitudinal sectional view of a part of the machine. Fig. 3 is a front view of the upper half of the machine as shown in Fig. 2. Fig. 4 is an enlarged perspective view, reversed, of a portion of one of the float-bars detached from the machine and with a number of the floats or checks attached thereto. Fig. 5 is a view of one of the floats detached.

$A'$ is the main frame or casing of the machine, having the feed-hopper $A^2$ at one end, and with a supporting-leg, $A^3$, by which the frame may be supported and its inclination regulated.

The bottom of the casing or frame $A'$ is formed of a screen, B, of wire-cloth, perforated iron, or other material of suitable-sized mesh or perforation, according to the kind of grain to be separated. The screen may be made removable, so that screens of different size of mesh may be attached to the frame to adapt it to different kinds of grains; but the screen may be attached permanently to the frame, if preferred.

The sides of the casing $A'$ are formed with grooves $a$, into which a series of cross-bars, D, are inserted and secured at suitable distances apart by nailing or otherwise fastening them. Attached loosely to the lower edges of these cross-bars are a series of triangular floats or check-plates, $b$, the floats being attached at one of their apexes and allowed to lie with their free flat edges in contact with the upper surface of the screen B, as shown in Fig. 2. The floats are arranged upon the bars D alternately, so that the floats of one bar come opposite to the spaces between the floats of the next bar below, whereby no open continuous intervals occur through which the grain could flow without being affected by the floats.

The lower end of the casing $A'$ is provided with a combined foot and dividing board, $A^4$, which serves the double purpose of a support for the lower end of the machine and to keep the grain which flows over the "tail" from that which flows through the screen.

A feed-slide, $A^5$, is inserted into the lower end of the hopper $A^2$ to regulate the flow of the grain from the hopper to the screen. The grain as it flows down the screen runs under the free ends of the floats $b$ and raises them up and passes beneath them, the function of the floats being to serve as flexible retarders to the grain to hold it in check and keep it moving with a slow but steady motion down the screen, the pressure of the floats upon the grain having a tendency to keep the individual kernels in a lengthwise position upon the screen, so that the long kernels of grain will pass over the large meshes in the screen and down over the tail at $A^4$, while the shorter kernels and the foul seeds will drop through the meshes of the screen. By this simple device and without the use of power a perfect and rapid separation of the large kernels from the small kernels and free of all foul seeds is obtained in a very simple and inexpensive manner.

The floats $b$ may be attached to the bars D in any suitable manner that will leave the ends free to lie loosely upon the screen; but I have found by experience that a simple large-headed nail, $d$, (see Fig. 4,) with sufficient space about the nail in the eye of the float, serves the purpose, and is a very simple and inexpensive method of securing the floats.

Another feature of this device is the presence of the bars D above the screen B, which not only serve to support the suspended ends of the floats b, but also to distribute the grain in its proper position upon the screen.

I have found by experiment that the best results are produced when the bars D are formed about one and one-fourth (1¼) inch wide and placed about one (1) inch apart, with a space of about one-half (½) an inch between the bars and the screen; but these dimensions may be varied, if required.

The casing A' may be made of any width or length; but generally the length should not exceed four and one-half (4½) feet and the width according to the capacity required.

Having thus described my invention, what I claim as new is—

1. In a grain-separator, in combination with an adjustably-inclined screen, a series of alternately-arranged loosely-suspended floats inclined forward and resting lightly upon the screen, substantially as and for the purpose herein specified.

2. In combination with an inclined screen and a series of cross-bars located above the screen, a series of alternately-arranged floats suspended loosely from the said cross-bars, inclined forward, and resting lightly upon the screen, substantially as and for the purpose herein specified.

In testimony whereof I have hereunto set my hand in the presence of two subscribing witnesses.

CHARLES DOUGLASS EDWARDS.

Witnesses:
C. SMITH,
HEMAN BLACKMER.